(12) United States Patent
Zheng et al.

(10) Patent No.: US 9,100,351 B2
(45) Date of Patent: *Aug. 4, 2015

(54) METHOD AND SYSTEM FOR FORWARDING DATA IN LAYER-2 NETWORK

(71) Applicant: Huawei Technologies Co., Ltd., Shenzhen (CN)

(72) Inventors: Ruobin Zheng, Shenzhen (CN); Hongyu Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/319,499

(22) Filed: Jun. 30, 2014

(65) Prior Publication Data

US 2014/0314090 A1    Oct. 23, 2014

Related U.S. Application Data

(63) Continuation of application No. 12/098,837, filed on Apr. 7, 2008, now Pat. No. 8,804,713, which is a continuation of application No. PCT/CN2007/070486, filed on Aug. 15, 2007.

(30) Foreign Application Priority Data

Aug. 15, 2006 (CN) ............... 2006 1 0115389

(51) Int. Cl.
*H04L 12/741* (2013.01)
*H04L 12/46* (2006.01)
*H04L 29/12* (2006.01)

(52) U.S. Cl.
CPC ............ *H04L 45/74* (2013.01); *H04L 12/4633* (2013.01); *H04L 12/4641* (2013.01); *H04L 29/12839* (2013.01); *H04L 61/6022* (2013.01)

(58) Field of Classification Search
None
See application file for complete search history.

(56) References Cited

U.S. PATENT DOCUMENTS 6,590,861 B1    7/2003    Vepa et al.
2002/0156613 A1    10/2002    Geng et al.
(Continued)

FOREIGN PATENT DOCUMENTS

CN    1426169    6/2003
CN    1194508    3/2005
(Continued)

OTHER PUBLICATIONS

Allan, David et al., "Ethernet as Carrier Transport Infrastructure", Broadband Access Series, IEEE Communications Magazine, Feb. 2006, pp. 134-140.
(Continued)

*Primary Examiner* — Steve Young
(74) *Attorney, Agent, or Firm* — Slater & Matsil, L.L.P.

(57) ABSTRACT

A method for forwarding data in a layer-2 network is provided. A first node receives a first data packet including a customer destination MAC address and customer data; generates a second data packet including a source virtual MAC address, a destination virtual MAC address and at least part of the first data packet. The at least part of the first data packet includes the customer destination MAC address and the customer data. The source virtual MAC address is a virtual MAC address assigned to the first node, and the destination virtual MAC address corresponds to the customer destination MAC address. The virtual MAC address assigned to the first node includes a first virtual MAC address segment with a first mask, which indicates a virtual MAC address space including virtual MAC addresses of child nodes of the first node. Then the first node forwards the second data packet.

17 Claims, 7 Drawing Sheets

(56) References Cited

U.S. PATENT DOCUMENTS

| | | |
|---|---|---|
| 2003/0069993 A1 | 4/2003 | Na et al. |
| 2003/0147405 A1 | 8/2003 | Khill |
| 2004/0081203 A1 | 4/2004 | Sodder et al. |
| 2004/0141468 A1 | 7/2004 | Christensen et al. |
| 2004/0193708 A1 | 9/2004 | Matsumoto |
| 2005/0243845 A1 | 11/2005 | Higashitaniguchi et al. |
| 2006/0098644 A1 | 5/2006 | Pullela et al. |
| 2006/0126622 A1 | 6/2006 | Park et al. |
| 2006/0182145 A1 | 8/2006 | Seo et al. |
| 2007/0076719 A1* | 4/2007 | Allan et al. ............ 370/392 |
| 2007/0201490 A1 | 8/2007 | Mahamuni |
| 2008/0049621 A1* | 2/2008 | McGuire et al. ........ 370/236.2 |
| 2008/0186965 A1 | 8/2008 | Zheng et al. |

FOREIGN PATENT DOCUMENTS

| | | |
|---|---|---|
| CN | 1677951 | 10/2005 |
| CN | 1725730 | 1/2006 |
| CN | 1739276 | 2/2006 |
| CN | 1815944 | 8/2006 |
| CN | 101127696 | 6/2012 |
| EP | 1492268 | 12/2004 |
| WO | 03021832 | 3/2003 |
| WO | 03101122 | 12/2003 |
| WO | 2006064561 | 6/2006 |

OTHER PUBLICATIONS

IEEE, "IEEE Standard for Local and metroplitan Area Networks, Virtual Bridged Local Area Networks, Amendment 4: Provider Bridges," IEEE Std 802.1adTM-2005, The Institute of Electrical and Electronics Engineers, Inc., May 26, 2006, 74 pages.

IEEE, "IEEE Standard for Local and metropolitan area networks—Virtual Bridged Local Area Networks, Amendment 7: Provider Backbone Bridges," IEEE Std 802.1ahTM-2008, The Institute of Electrical and Electronics Engineers, Inc., Aug. 14, 2008, 121 pages.

IEEE, "IEEE Standard for Local and metroplitan area networks, Virtual Bridged Local Area Networks," IEEE Std 802.1QTM-2005 The Institute of Electrical and Electronics Engineers, Inc., May 19, 2006.

* cited by examiner

METHOD AND SYSTEM FOR FORWARDING DATA IN LAYER-2 NETWORK

CROSS-REFERENCE TO RELATED APPLICATIONS

This application is a continuation of U.S. patent application Ser. No. 12/098,837, filed Apr. 7, 2008, which is a continuation of International Application No. PCT/CN2007/070486, filed Aug. 15, 2007, which claims the benefit of Chinese Patent Application No. 200610115389.X, filed Aug. 15, 2006. The above applications are incorporated herein by reference in their entireties.

FIELD

The present disclosure relates to data transmission technique in layer-2 network, and particularly, to a method and system for forwarding data in layer-2 network.

BACKGROUND

The statements in this section merely provide background information related to the present disclosure and may not constitute prior art.

Many technologies have been applied to networks of Ethernet technology, e.g., Provider Backbone Transport (PBT) is deployed based on Provider Backbone Bridges Network which is defined by IEEE 802.1ah (i.e., MACinMAC).

IEEE 802.1ah defines a new architecture and bridge protocol which are compatible and interoperable with IEEE 802.1ad Provider Bridge (PB). Therefore multiple PB networks can be connected and form at least $2^{24}$ Virtual Local Area Networks (VLAN).

The structure of the Provider Backbone Bridges Network defined by IEEE 802.1ah is shown in FIG. 1. The Provider Backbone Bridges network is built on the basis of IEEE 802.1ad (also called QinQ) and is able to encapsulate a complete PB packet into a Provider Backbone Bridge (PBB) packet. Therefore, the Provider Backbone Bridges network provides a hierarchy network, and serves as the basis of Ethernet connection or tunnel technology.

A message encapsulated as defined in IEEE 802.1ah is shown in table 1:

TABLE 1

| B-DA | B-SA | B-Tag | I-Tag | S-Tag | C-DA | C-SA | C-DATA |
| --- | --- | --- | --- | --- | --- | --- | --- |

The B-DA is a Provider Backbone Bridge Destination MAC Address, the B-SA is a Provider Backbone Bridge Source MAC Address, the B-Tag is a Provider Backbone Bridge Tag, the I-Tag is a Service Instance Tag, the S-Tag is a Service Tag, the C-DA is a Customer Destination MAC Address, the C-SA is a Customer Source MAC Address, and the C-Data is Customer Data.

As can be seen from table 1, a customer packet, transported from the PB to the PBB and including the C-DA, C-SA and C-Data, is completely encapsulated in the PBB packet. The Provider Backbone Bridge MAC Address (B-MAC) (i.e., the B-DA and B-SA) is the MAC address of PBB device. The B-Tag is defined on the basis of IEEE 802.1Q. In a PBB network, a packet may only be forwarded in a standard Ethernet forwarding process on the basis of the B-MAC and the B-Tag according to IEEE 802.1Q.

It can also be seen from table 1 that in this hierarchy network, the MAC address of the customer is isolated from the MAC address of the provider network device. The TAG of the customer data is isolated from the TAG of the provider TAG.

The PBT technology on the basis of the IEEE 802.1ah provides features as follows. A PBT device needs to support Individual VLAN Learning (IVL). Because the PBT device supports the IVL, VLANs may be categorized into connection-oriented VLAN (i.e., PBT VLAN) and a connectionless VLAN (i.e., common VLAN). In other words, a part of the VLANs may be designated as the PBT VLAN on PBT related device and the part of VLANs can function independently without influencing common VLANs, MAC address learning and spanning tree protocol are disabled in the PBT VLAN, and broadcast function as well as multicast and broadcast of unknown packets in the PBT VLAN are disabled.

The PBT network is shown in FIG. 2. The provisioning and management system of the network connects with all Provider Edge Bridges (PEB, the PEs in the drawing) and Provider Bridge (PBs, the Ps in the drawing) in the network and is used for configuration and link maintenance, e.g., control and management functions such as status detection and path protection.

As shown in FIG. 2, the PBT network includes a number of PEs and Ps which are generally Ethernet switches supporting IVL. The MAC addresses of destination devices and the PBT Virtual LAN Identifiers (VID) are configured respectively in the Ethernet switches. The destination MAC address and the VID constitute a tag which is an identifier of a channel. An Ethernet Switched Path (ESP) is formed by transporting the identifier of the channel over the plurality of the Ethernet switches supporting the IVL. The channel may be a connection, i.e. Ethernet Virtual Connection (EVC) or tunnel. The MAC address, VID and forwarding mode used by the PBT technology are in compliance with Standard IEEE 802.1q.

The method for forwarding a data packet is as follows.

The provisioning and management system configures links, for example, configures the links of the PBT dynamically or statically via the control plane of General Multi-Protocol Label Switching (GMPLS), and maintains the state of the links.

Subsequently, the provisioning and management system learns the MAC address by using the IVL on the network nodes, such as the PE and P in FIG. 2, on the transport path ESP of the PBT, and configures the forwarding table of MAC addresses of the PBT.

A PE forwards customer traffic to a next-hop node according to the forwarding table; the next-hop node forwards the customer traffic to another next-hop node according to the forwarding table. At last, the customer traffic is forwarded to another PE connected with a destination customer network. The intermediate network nodes, i.e., the Ps, forward packets without any other processing.

For example, in FIG. 2, the provisioning and management system configures an ESP from PE1 to PE3 statically. A forwarding table is configured on PE1, intermediate Ps and PE3. The MAC address of PE3 and VLAN 44 are taken as the tag of the ESP. The MAC address of PE1 contained in packets would indicate the source device of the ESP. The ESP is a unidirectional path.

FIG. 3 is a schematic diagram illustrating the structure of a PBT network node device in the prior art. The device includes a first module, a second module and a third module. The third module is optional. The first module may be a physical layer processing module mainly used for providing physical layer functions. The second module may include a MAC layer processing unit and a forwarding unit. The MAC layer processing unit is used for providing MAC layer processing functions including IVL, MAC address configuration and MAC address forwarding table maintenance. The forwarding unit is used for forwarding, via the first module, the data packet processed on the MAC layer. The third module may include a data processing module of layers above layer-2. The MAC layer processing unit of the second module sends, according to the information in data packets such as the destination address, processed data of data packets to the third module for data processing on layers above layer-2. The data processed by the third module is sent to the first module through the forwarding unit in the second module and is further forwarded to other network nodes. The MAC addresses in the prior art are globally unique MAC addresses of devices. Therefore the second module has to perform IVL to learn the MAC address of other PBT network node device to configure and maintain the MAC address forwarding table.

It can be seen that the PBT technology in the prior art has the following disadvantages.

The MAC addresses in the prior art are globally unique MAC addresses of devices which can not be planned by a network administrator in a unified manner. Therefore, MAC address convergence can not be implemented, and location of the connection ends can not be learned through MAC addresses.

Because the length of a MAC address plus VID is 60 bits, theoretically a label containing a combination of a MAC address and a VID may have 260 possibilities of values. However, the MAC addresses actually in use are MAC addresses of devices, and the number of ESPs that reach a device is determined according to the allocated PBT VID which is only 12 bits long and provides only 4096 possibilities, so the tag is subject to narrow choices.

The ESP is identified with the MAC address of the destination device and the VID, the destination MAC address is the global MAC address of the device and a packet is forwarded by intermediate nodes to one single destination node instead of multiple destination nodes.

SUMMARY

An embodiment of the present disclosure provides a method for forwarding data in a layer-2 network. A first node receives a first data packet including a customer destination MAC address and customer data; generates a second data packet including a source virtual MAC address, a destination virtual MAC address and at least part of the first data packet. The at least part of the first data packet includes the customer destination MAC address and the customer data. The source virtual MAC address is a virtual MAC address assigned to the first node, and the destination virtual MAC address corresponds to the customer destination MAC address. The virtual MAC address assigned to the first node includes a first virtual MAC address segment with a first mask, which indicates a virtual MAC address space including virtual MAC addresses of child nodes of the first node. Then the first node forwards the second data packet. Various embodiments of the present disclosure provide a method and system for forwarding data in layer-2 network, so that the number of ESPs that reach a node is not limited by the VID of the designated PBT network, i.e., subject to less limitations.

Another embodiment of the present disclosure provides a network including a management domain, which includes a plurality of nodes. A first node of the plurality of nodes receives a first data packet including a customer destination media access control (MAC) address and customer data. The first node generates a second data packet including a source virtual MAC address, a destination virtual MAC address and at least part of the first data packet. The at least part of the first data packet includes the customer destination MAC address and the customer data, the source virtual MAC address is a virtual MAC address assigned to the first node, and the destination virtual MAC address corresponds to the customer destination MAC address. The virtual MAC address assigned to the first node includes a first virtual MAC address segment with a first mask, which indicates a virtual MAC address space including virtual MAC addresses of child nodes of the first node. The first node then forwards the second data packet via an egress port corresponding to the destination virtual MAC address.

A further embodiment of the present disclosure provides a node device in a management domain of a layer-2 network. The node device includes a central processing unit (CPU) and a computer readable medium having computer executable instructions stored thereon that, when executed by the CUP, causes the CPU to: receive a first data packet including a customer destination media access control (MAC) address and customer data; generate a second data packet including a source virtual MAC address, a destination virtual MAC address and at least part of the first data packet. The at least part of the first data packet includes the customer destination MAC address and the customer data, the source virtual MAC address is a virtual MAC address assigned to the node device, and the destination virtual MAC address corresponds to the customer destination MAC address. The virtual MAC address assigned to the node device includes a first virtual MAC address segment with a first mask, which indicates a virtual MAC address space including virtual MAC addresses of child nodes of the node device. The CUP is then caused to forward the second data packet via an egress port corresponding to the destination virtual MAC address.

DESCRIPTION OF DRAWINGS

The drawings described herein are for illustration purposes only and are not intended to limit the scope of the present disclosure in any way.

DETAILED DESCRIPTION OF EMBODIMENTS

Figure 1:
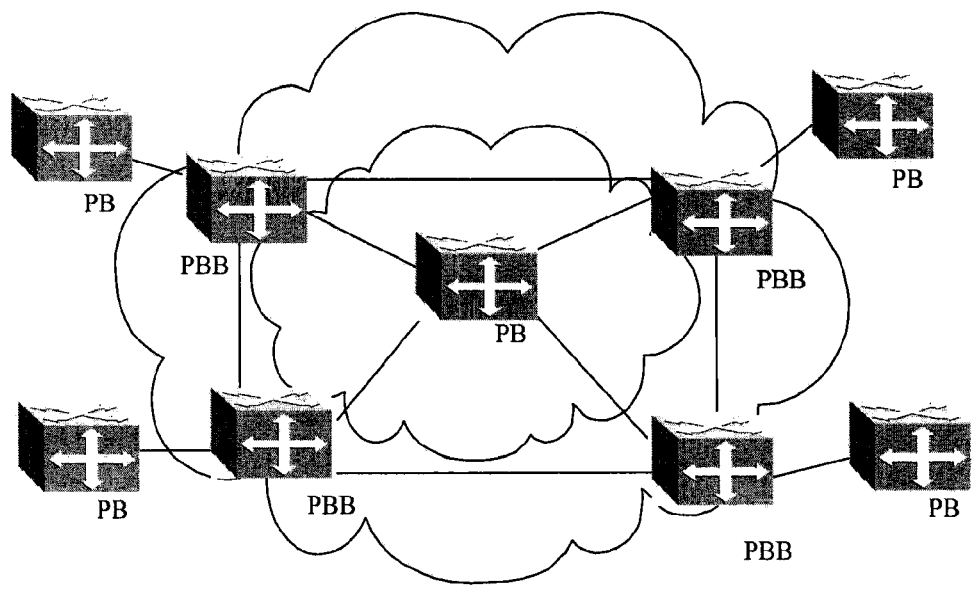
FIG. 1 is a schematic diagram illustrating the structure of the Provider Backbone Bridges Network defined by IEEE 802.1ah.
Figure 2:
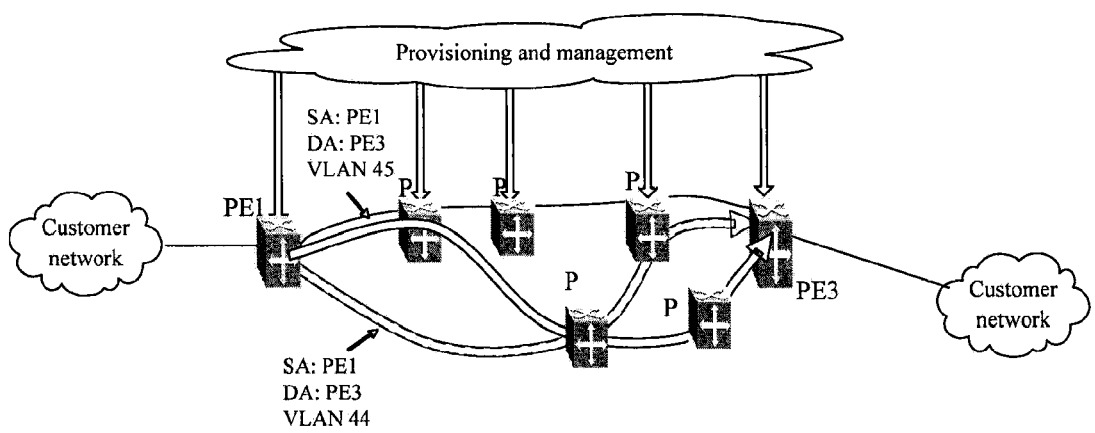
FIG. 2 is a schematic diagram of a PBT network.

The following description is merely exemplary in nature and is not intended to limit the present disclosure, application, or uses.

The present disclosure is further described in detail with reference to the accompanying drawings as well as embodiments so as to make the technical solution and merits more apparent.

According to the method and the system for forwarding data in a layer-2 network provided by various embodiments of the present disclosure, a management domain is set up in the network, virtual MAC addresses are assigned to the nodes in the management domain in a unified manner according to a predetermined convergence principle, and identifier information for indicating the virtual MAC address domain of a node is introduced into each of the virtual MAC addresses. When the network forwards data, a non-convergence node encapsulates a data packet with a virtual MAC address and forwards the data packet to a destination node via a data forwarding path established on the basis of the virtual MAC addresses.

The various embodiments of the present disclosure can be implemented in any network that uses Ethernet technologies, and can further be applied to any other network that uses MAC addresses. The virtual MAC address configuration and application method that may be adopted in various embodiments of the present disclosure are explained as follows.

The virtual MAC addresses exist only in the management domains of operator networks, which are isolated from the MAC addresses of the customers by data encapsulation.

The identifier information for indicating a virtual MAC address domain can be a MAC address segment with a mask. The mask is expressed by the number of "one" or "zero" bits in the binary notation of the mask. The mask may be a normal subnet mask, i.e., a mask with leading bits set to 1, e.g., a mask '4' means F000-0000-0000, or the mask may be an inverse mask, i.e., a mask 0 in the lower bit, e.g., the mask '4' means FFFF-FFFF-FFFF0. Inverse masks are used in the description of embodiments.

The mask of virtual MAC address can be explicit, i.e., the mask is the lower bits of the MAC address, e.g., the lower 8 bits, and the number of bits expressed by the mask can either include the bits that are occupied by the mask, such as in 00E0-ABCD-XX10, in which XX10 is the part that the mask identifies, or exclude the bits occupied by the mask, such as in 00E0-ABXX-XX10, XXXX is the part that the mask identifies. The mask can also be implicit. i.e., indicated by a predetermined rule or other configurations, for example, the mask is 00E0-XXXX-XXXX/32 saved in a node. Implicit masks are used in the description of embodiments.

The form 00E0-2000-XXXX/16 is used for indicating a virtual MAC address domain, in which 'X' is a hexadecimal number from 0 to F. The virtual MAC address domain includes the virtual MAC address space from 00E0-2000-0000 to 00E0-2000-FFFF.

When inverse masks are used, the longer a mask is, the more virtual MAC addresses are contained, and the higher the level of the virtual MAC address is. For example, 00E0-XXXX-XXXX/32 is in a higher level than 00E0-2000-XXXX/16. Normal masks will show just the opposite circumstances.

A certain amount of virtual MAC addresses are reserved in each virtual MAC address domain to be a broadcast virtual MAC address domain. For example, virtual MAC addresses with straight is in lower bits indicate broadcast virtual MAC addresses in the corresponding domain. For example, 00E0-2000-1FFF/12 indicates a node broadcast address in 00E0-2000-1XXX/12 domain, and the latter indicates the broadcast domain of the former.

Network nodes can be categorized into convergence nodes and non-convergence nodes according to the ways the nodes process data packets. The network nodes with convergence function are convergence nodes, and the rest are non-convergence nodes.

Virtual MAC addresses of network nodes are configured for network nodes in different levels based on predetermined convergence levels. The nodes with identical masks will be put into the same level. For example, the convergence level 1 has the largest inverse mask to indicate the virtual MAC address domain of the nodes in the level. The virtual MAC addresses/domains of nodes in each convergence level include the virtual MAC addresses/domains of its child nodes, i.e., except for the nodes in convergence level 1, the virtual MAC address and domain of each node in the other convergence level is a subset of the virtual MAC address and domain of a parent node of the node. For example, when the virtual MAC address of a parent node is 00E0-2000-0000/16, the virtual MAC address of its child node may be 00E0-2000-1000/8 or 00E0-2000-0010/4, but cannot be 00E0-3000-0000/16.

An exemplary embodiment is hereafter given to further describe the present disclosure.

Figure 4:
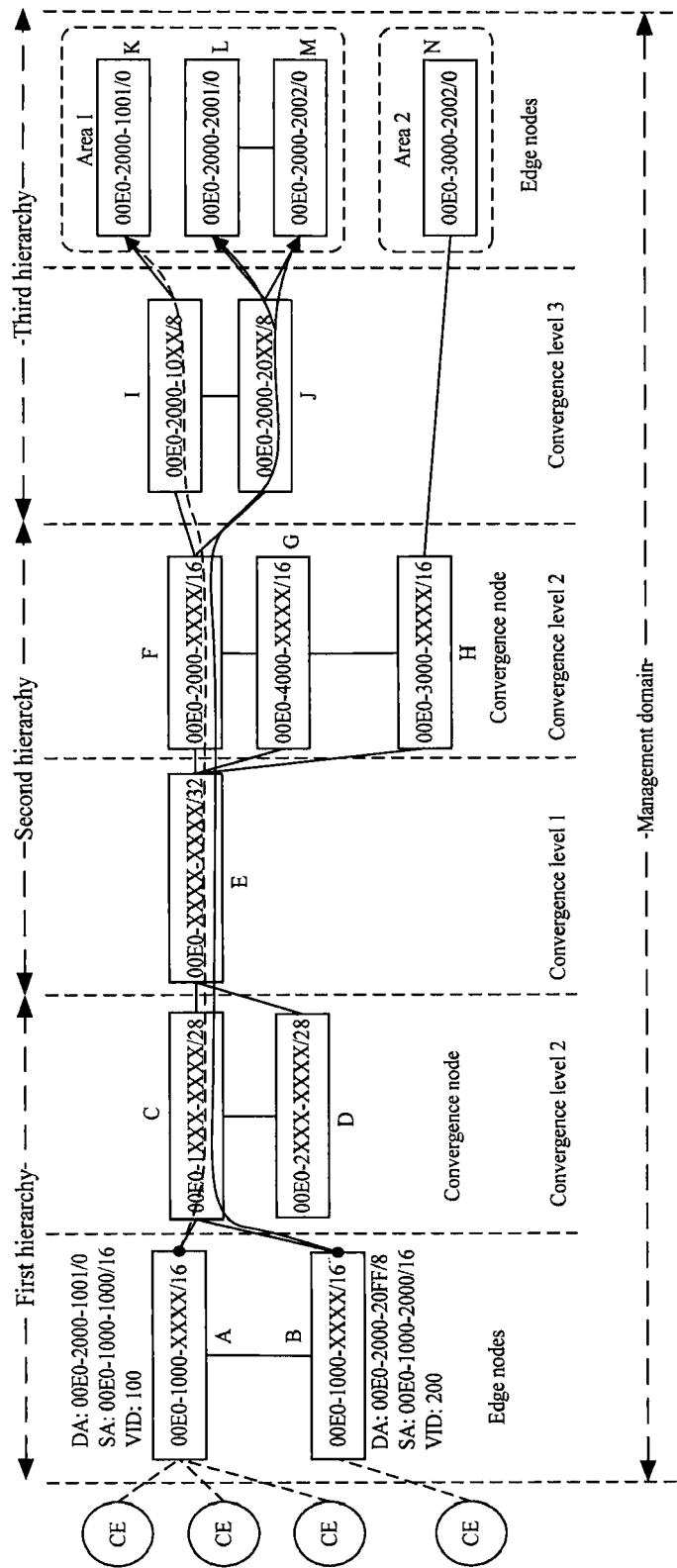
FIG. 4 is a schematic diagram of a transport network according to the present disclosure.

FIG. 4 is a schematic diagram of a transport network according to an embodiment of the present disclosure. This PBT network is configured with a management domain of 14 nodes from node A to node N, among which the nodes A, B, K, L, M and N are at the edge of the network, node A and B are connected to Customer Equipment (CE) outside of the management domain respectively, and non-convergence nodes K, L, M and N can be connected to other network devices outside the management domain (not shown in FIG. 4).

Each node in this network has the function to configure its own virtual MAC address. FIG. 4 shows the virtual MAC address segment with masks for nodes A, B, C, D, E, F, G, H, I and J, as well as the virtual MAC addresses configured by nodes K, L, M and N. From the values of the masks for the convergence nodes in FIG. 4, it can be seen that the management domain has three convergence hierarchies: node E is in the convergence level 1, nodes C, D, F, G and H are in the convergence level 2 and nodes I and J are in the convergence level 3. The mask of the node K, L, M or N at network edge is 0, i.e., the nodes are children nodes in the lowest level of the management domain and cannot be the parent nodes of any other nodes. The nodes A and B at the network edge have 4 as masks, i.e., though the nodes A and B are also children nodes in the lowest level of the management domain, more children nodes can be attached to the node A or B when the management domain is expanded, and the node A or B can be a parent node of nodes in other management domains to achieve the cascading of multiple management domains.

Figure 4A:
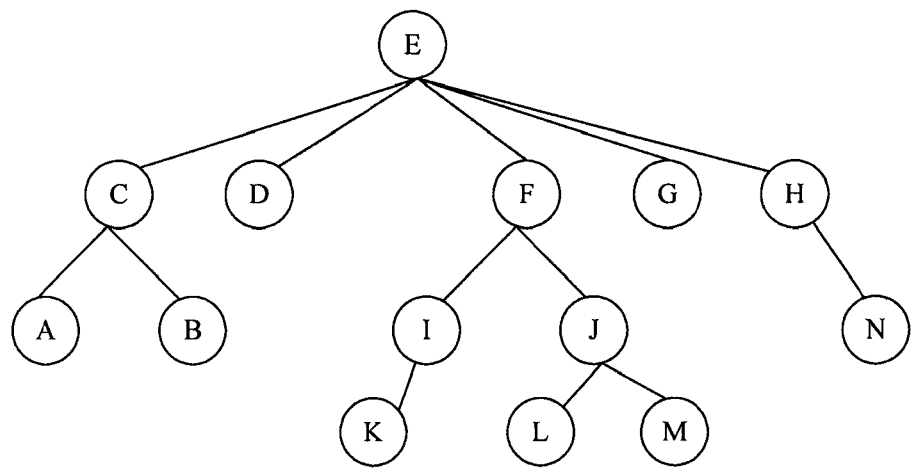
FIG. 4a is a schematic diagram illustrating tree structure of nodes in the network shown in FIG. 4.

FIG. 4 shows a virtual MAC address management domain 00E0-XXXX-XXXX/32. The virtual MAC address management domain includes a virtual MAC address root node, i.e., node E, and a number of children nodes. These nodes in different levels form a tree topology as shown in FIG. 4a. The virtual MAC address mask of a parent node is longer than the virtual MAC address masks of its children nodes, i.e., the virtual MAC address domain of the parent node contains the virtual MAC address domain of its children nodes. One parent node may have multiple children nodes, and the virtual MAC address domains of the children nodes do not overlap. One child node has one parent node and nodes in the same level with the same parent node may be connected to each other freely. However, nodes in the same level with different parent nodes cannot be connected to each other directly. In FIG. 4, the root node E has the largest virtual MAC address domain, which is the same as the management domain 00E0-XXXX-XXXX/32.

Figure 5:
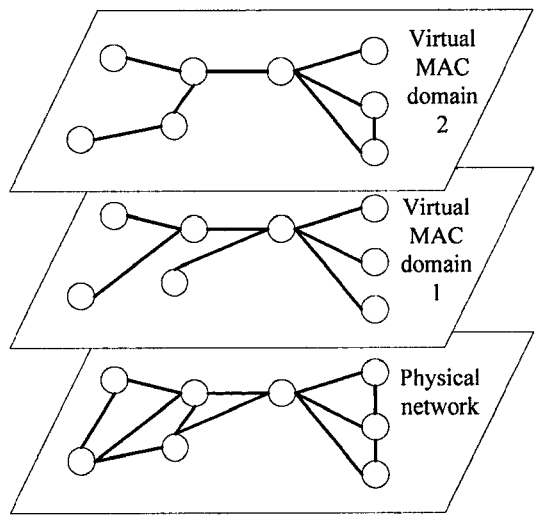
FIG. 5 is a schematic diagram illustrating the relation between a physical network and a virtual MAC address domain according to the present disclosure.

In practice, a same node may have different virtual MAC addresses, and a physical network can support multiple virtual MAC address domain solutions at the same time. These virtual MAC address domains may use a same physical network but are logically independent of different relations and topology for the physical nodes. For example, FIG. 5 is a schematic diagram illustrating the relationship between a physical network and a virtual MAC address domain, which shows the corresponding relationship between one physical network and the two different virtual MAC address domains supported by the physical network.

A data forwarding path, such as ESP/EVC, can be identified by the combination of a destination virtual MAC address and a VID, or by the destination virtual MAC address, corresponding forwarding path can also be determined by the combination of the destination virtual MAC address and the VID or determined by the destination virtual MAC address.

FIG. 4 also shows a P2P ESP formed by nodes A-C-E-F-I-K, and a P2MP transport path formed by nodes B-C-E-F-J-L/M.

The P2P ESP formed by nodes A-C-E-F-I-K can be established with either dynamic or static configurations. Virtual MAC addresses are assigned to these network nodes. Subsequently, virtual MAC forwarding tables including destination virtual MAC addresses, VIDs, and port numbers are configured for the nodes.

In the data path formed by nodes A-C-E-F-I-K shown in FIG. 4, when the destination virtual MAC address of node A is set to be 00E0-2000-1001/0 and the VID of node A is 100, the virtual MAC forwarding table for the intermediate nodes shall contain the entries shown in Table 2.

TABLE 2

| Node | Virtual MAC Address | VID | Egress port (represented by the node connected to the egress port for convenience in the description) |
|---|---|---|---|
| A | 00E0-2000-1001/0 | 100 | C |
| C | 00E0-2000-1001/0 | 100 | E |
| E | 00E0-2000-1001/0 | 100 | F |
| F | 00E0-2000-1001/0 | 100 | I |
| I | 00E0-2000-1001/0 | 100 | K |

Table 2 shows the table entries in the virtual MAC forwarding tables for each of the nodes on the ESP. For example, the virtual MAC forwarding table for node A contains Virtual MAC address 00E0-2000-1001/0, VID 100, and egress port C.

Virtual MAC address tables and data forwarding solutions may also employ virtual MAC address convergence, i.e., the virtual MAC address forwarding table entries with virtual MAC addresses belonging to the same virtual MAC address domain and having the same egress port are converged into one entry. Multiple ESPs at a node will be converged into a single converged ESP in this way, and entries in the forwarding tables are saved. If the ESP is identified by the combinations of the virtual MAC addresses and the VIDs, the VIDs also need to be same in the convergence.

For example, for node E in FIG. 4, the two table entries in Table 3 can be converged in the single table entry in Table 4.

TABLE 3

| Destination virtual MAC Address | VID | Egress port (represented by the node connected to the egress port for convenience in the description) |
|---|---|---|
| 00E0-2000-2001/0 | 100 | F |
| 00E0-2000-2002/0 | 100 | F |

TABLE 4

| Destination virtual MAC Address | VID | Egress port (represented by the node connected to the egress port for convenience in the description) |
|---|---|---|
| 00E0-2000-XXXX/16 | 100 | F |

In the above example, the combination of a destination virtual MAC address and a VID are used for identifying an ESP, so both the destination virtual MAC address and the VID are needed to index the egress port while the forwarding table is looked up. The destination virtual MAC address can be used for identifying an ESP, and in such case the virtual MAC address is needed to index the egress port while the forwarding table is looked up.

Because implicit masks are used in the embodiment, the virtual MAC addresses in Tables 2 and 3 are the same as in the prior art, i.e., the masks are hidden. The nodes can find corresponding egress port by using the destination virtual MAC address 00E0-2000-1001/0 and VID 100, and then forward data packets to that egress port.

A node will broadcast a data packet received with a broadcast virtual MAC address as the destination virtual MAC address as follows. On the uplink, a child node sends the data packet to the parent node in unicast; on the downlink, a parent node as a convergence node forwards the broadcast data packet to corresponding children nodes according to corresponding virtual MAC address table entries. If the broadcast MAC address domain indicated by the destination virtual MAC address in the data packet is smaller than the virtual MAC address domain of the current node, unicast is used for forwarding the data packet to corresponding child node according to the virtual MAC address table entry. If the broadcast domain is equal to or larger than the virtual MAC address domain of the current node, the data packet will be copied to all the children nodes in the domain having the VID carried by the data packet.

On the P2MP transport path formed by nodes B-C-E-F-J-L/M, the destination virtual MAC address configured for node B is 00E0-2000-20FF/8, and the VID is 200. The data transmission process includes the following actions. Node B forwards the data packet to its parent node, i.e., node C, in unicast, and node C forwards the data packet to its parent node, i.e., node E in unicast; the node E determines that the broadcast domain of the data packet is in the virtual MAC address domain of the node E. The node E forwards the data packet to the child node F in unicast, the node F processes the data in the same way as the node E does, and forwards the data packet to the node J in unicast. The node J determines that the broadcast domain of the data packet is the same as the virtual MAC domain of the node J. Therefore, the node J copies and forwards the data packet to all children nodes with VID 200, i.e., the nodes L and M. In this way, the P2MP connection is established, at the same time a broadcast is done in a virtual MAC address domain.

In this way, through the planning and configuration of virtual MAC addresses, a number of nodes can be chosen as the recipient nodes of the data packet at the same time. Therefore, multicast is achieved. Furthermore, by converging multiple P2MP connections in some way, e.g., by using the same VID, MP2MP connections can also be realized.

In application, the network shown in FIG. 4 can be achieved by cascading three-hierarchy networks. As shown in FIG. 4, nodes A, B, C and D can be configured as a first network hierarchy; nodes E, F, G and H can be configured as a second network hierarchy; and nodes I, J, K, L, M and N can be configured as a third network hierarchy.

In the first network hierarchy, the node A or B encapsulates a data packet from a Customer Equipment (CE) and forwards the data packet to a next-hop node according to the virtual MAC forwarding table configured for the node A or B, i.e., to the node C or node D respectively; or the node A or B receives a data packet from the node C or D, decapsulates the data packet, and sends the data packet to the CE.

The node C or node D forwards a data packet from the node A or B to the next-hop node, i.e., the node E in the second network hierarchy, according to the virtual MAC forwarding table configured for the node C or D; or the node C or node D forwards a data packet from the node E to the node A or B according to the virtual MAC forwarding table configured for the node C or D.

In the second network hierarchy, the node E forwards the data packet received from the node C or D to the next-hop node, i.e., the node F or node G or node H, according to the virtual MAC forwarding table configured for the node E; or the node E receives data from node F or node G or node H, and forwards the data packet to the node C or D according to the virtual MAC forwarding table configured for the node E.

The node F or G or H receives a data packet from the node E, forwards the data packet to the node I or J or N according to the virtual MAC forwarding table configured for the node F or G or H; or the node F or G or H receives a data packet from the node I or J or N and forwards the data packet to the node E according to the virtual MAC forwarding table configured for the node F or G or H.

In the third network hierarchy, the node I or J receives a data packet from the node F or G or H, and forwards the data packet to the node K or L or M according to the virtual MAC forwarding table configured for the node I or J; or the node I or J receives a data packet from the node K or L or M and forwards the data packet to the node F according to the virtual MAC forwarding table configured for the node.

The node K or L or M receives a data packet sent from the node I or J, decapsulates the data packet, and forwards the data packet to the outside of the cascaded network; or the node K or L or M receives a data packet from outside of the cascaded network, encapsulates the data packet, and forwards the data packet to a next-hop node, i.e., to the node I or J, according to the virtual MAC forwarding table configured for the node K or L or M.

The node N receives a data packet sent from the node H, decapsulates the data packet, and forwards the data packet to the outside of the cascaded network; or the node N receives a data packet from outside of the cascaded network, encapsulates the data packet, and forwards the data packet to a next-hop node, i.e., to the node H, according to the virtual MAC forwarding table configured for the node N.

The data forwarding process in the network shown in FIG. 4 is described in details hereafter.

Different data packet forwarding processes are employed for non-convergence nodes and convergence nodes, and the processes will be described separately.

Figure 6A:
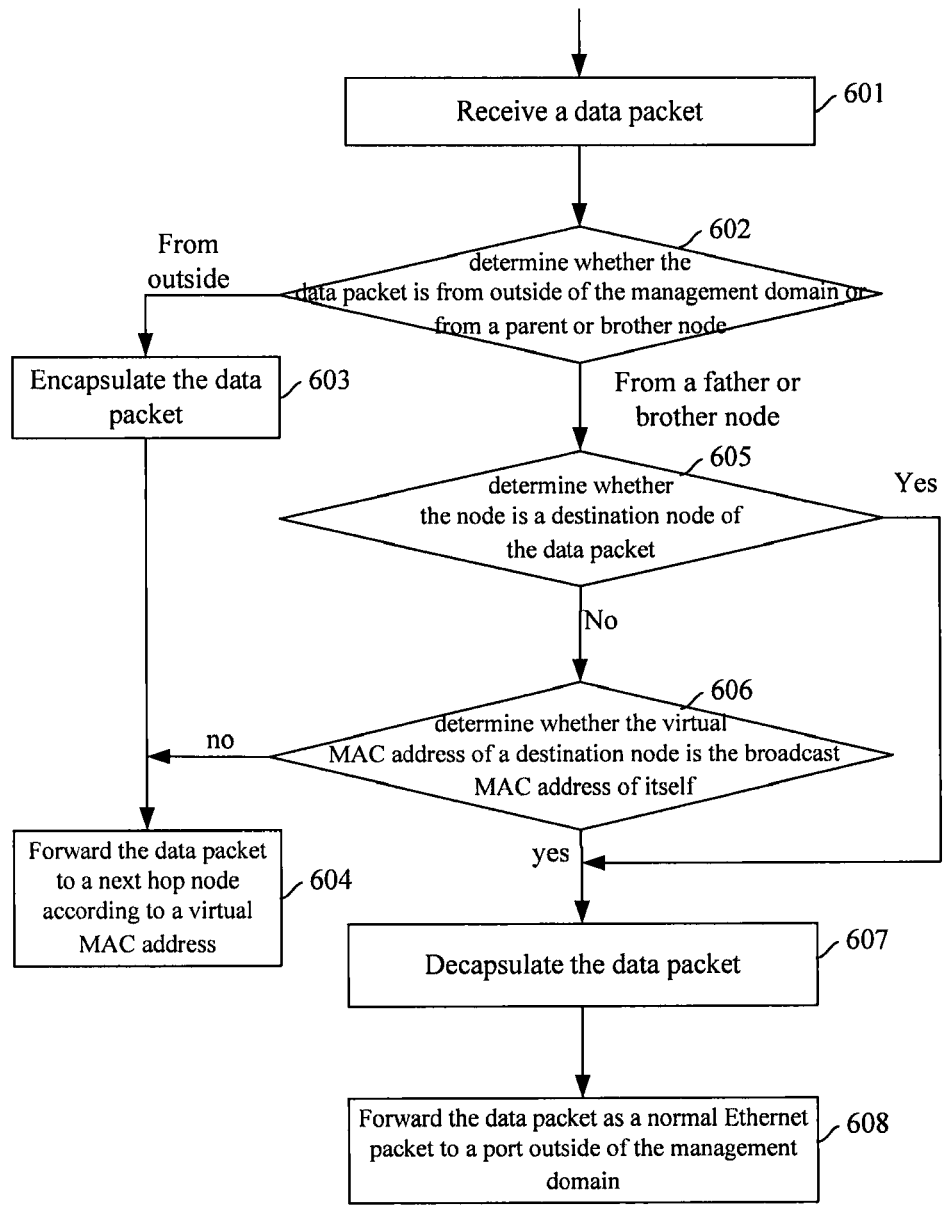
FIG. 6a is a flowchart illustrating a process for forwarding data by a non-convergence node in the network shown in FIG. 4.

FIG. 6a is a flowchart of a process for forwarding data by a non-convergence node in the network as shown in FIG. 4. The process is as follows.

Block 601: A node at the network edge receives a data packet.

Block 602: The node determines whether the data packet is sent from a device outside of the management domain or from a parent node or brother node in the management domain. If the data packet is from a device outside of the management domain, the process is proceeded to block 603, otherwise the process is proceeded to block 605.

In block 602, the source of the data packet can be determined according to the port from which the data packet is received.

Block 603: The node encapsulates the data packet by the destination virtual MAC address of the data and the virtual MAC address of the non-convergence node, and the non-convergence node is a source node.

In applications, multiple methods can be used for encapsulating the data packet. For example, the data packet can be encapsulated in the encapsulation format specified by 802.1ah; or the virtual MAC address of the source node, destination virtual MAC address of the data and the identifier of the virtual local area network can be inserted directly into the received data packet; or the customer source MAC address and customer destination MAC address can be replaced with the virtual MAC addresses of the source node and the destination of the data, respectively.

The destination virtual MAC address of the data can be obtained in advance by looking up the corresponding relationship between the customer destination MAC address and the destination virtual MAC address of the data according to the customer destination MAC address in the data.

Block 604: The node looks up the virtual MAC forwarding table to find corresponding egress port according to the virtual destination MAC address and VID, and forwards the data to a next-hop device according to the egress port. The process is returned to block 601 for the node to receive another data packet.

Block 605: The node determines whether the node is a destination node. If the node is the destination node, the process is proceeded to block 607, otherwise the process is proceeded to block 606.

In block 605, the determination can be made by determining whether the destination virtual MAC address included in the data packet matches the virtual MAC address of the node itself.

Block 606: The node determines whether the destination virtual MAC address is the broadcast virtual MAC address for the node. If the destination virtual MAC address is the broadcast virtual MAC address, the process is proceeded to block 607, otherwise the process is proceeded to block 604.

Block 607: The node decapsulates the data packet.

In this block, the decapsulation method corresponds to the encapsulation method. For example, the data packet can be decapsulated according to the encapsulation format specified by 802.1ah; or the virtual MAC address of the source node, destination virtual MAC address of the data and the identifier of the virtual local area network can be deleted directly from the received data packet; or the virtual MAC addresses of the source node and the destination of the data can be replaced with the customer source MAC address and customer destination MAC address, respectively.

Block 608: The node forwards the data packet to corresponding port outside the management domain in a normal Ethernet data packet forwarding process. The process is returned to Block 601 for the node to receive another data packet.

Figure 6B:
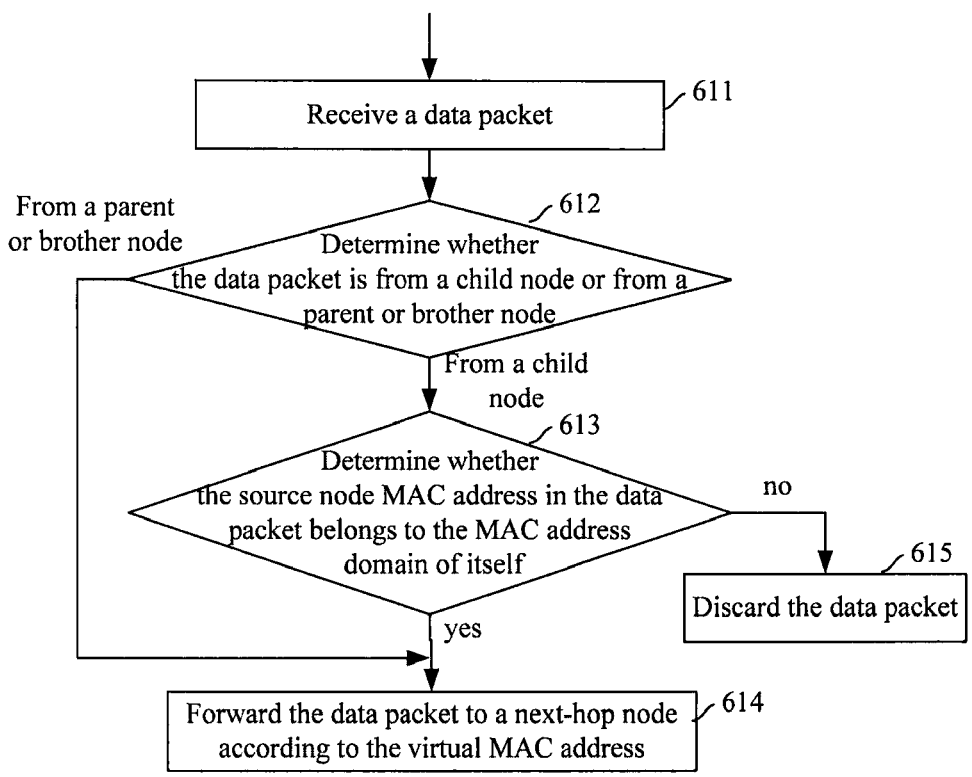
FIG. 6b is a flowchart illustrating a process for forwarding data by a convergence node in the network shown in FIG. 4.

FIG. 6b is a flowchart of a process for forwarding data by a convergence node in the network as shown in FIG. 4. The process is as follows.

Block 611: The convergence node receives a data packet.

Block 612: The convergence node determines whether the data packet is from a child node or from a parent node or a brother node. If the data packet is from a child node, the process is proceeded to block 613; if the data packet is from a parent node or a brother node, the process is proceeded to block 614.

In block 612, the determination can be made according to the port from which the data packet is received.

Block 613: The convergence node determines whether the source virtual MAC address in the data packet is in the virtual MAC address domain of the convergence node according to the mask configured for the convergence node, i.e., the virtual MAC address domain of the convergence node. If the source virtual MAC address is in the virtual MAC address domain of the convergence node, the process is proceeded to block 614; otherwise the process is proceeded to block 615.

Block 614: The convergence node looks up the virtual MAC forwarding table to find corresponding egress port according to the destination virtual MAC address and VID, and forwards the data packet to a next-hop node via the egress port. The process is returned to block 611 for the convergence node to receive another data packet.

Block 615: The convergence node discards the data packet. The process is returned to block 611 for the convergence node to receive another data packet.

The nodes in the embodiment shown in FIG. 4 are described in details hereinafter.

Figure 3:
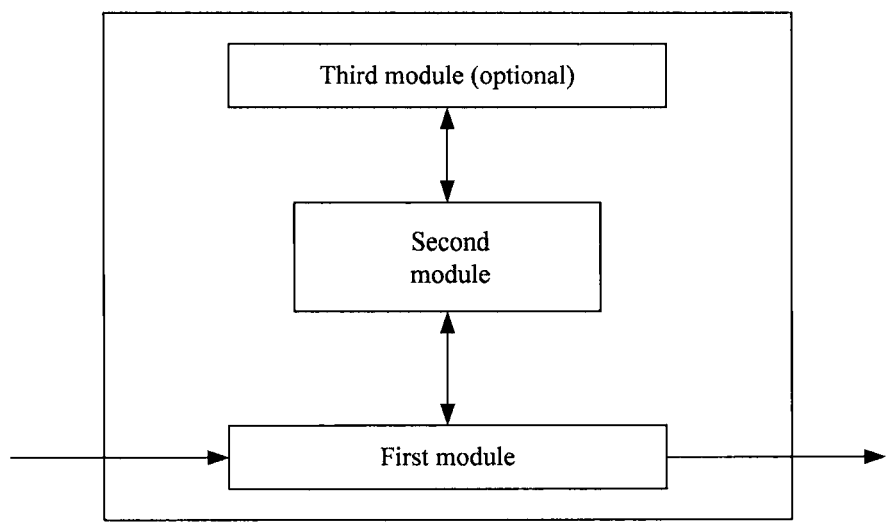
FIG. 3 is a schematic diagram of a conventional PBN network node device.
Figure 7:
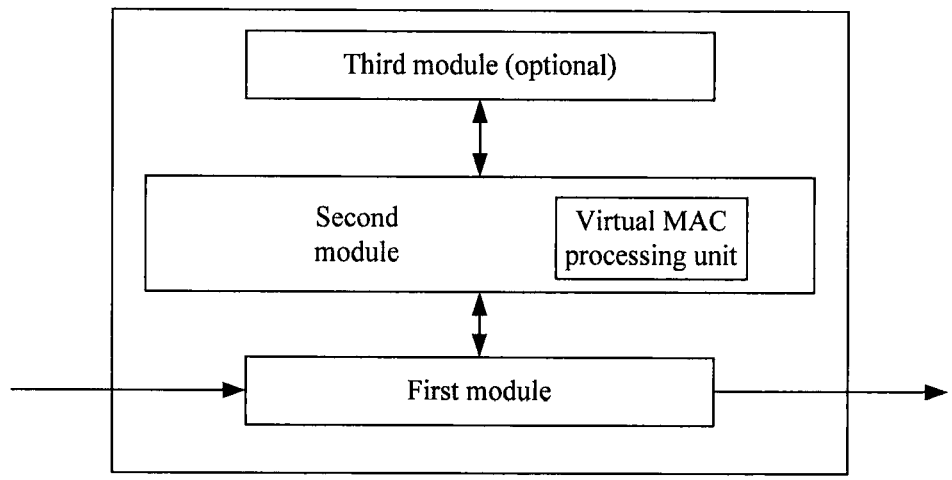
FIG. 7 is a schematic diagram of a node in the network shown in FIG. 4.

The nodes in the embodiment shown in FIG. 4, including convergence nodes and non-convergence nodes, have the same internal logic structures as shown in FIG. 7. FIG. 7 illustrates the structure of a node according to the embodiment shown in FIG. 4. The structure of the node is similar to the structure of a PBT node in prior art shown in FIG. 3. Each of the two nodes has a first module used for providing physical layer functions, a second module for providing the MAC layer functions, and a third module which is optional. The first module forwards the data from an external connection of the node to the second module and forwards data from the second module to a device outside the node. The difference between the node structure in FIG. 7 and node structure in FIG. 3 is that the second module in the structure in FIG. 7 includes a virtual MAC processing unit.

In the virtual MAC processing unit, the virtual MAC address of the node, identifier information for indicating the virtual MAC address domain at which the node is located and a virtual MAC forwarding table configured on the basis of the virtual MAC address are configured.

The virtual MAC processing unit determines the data packet from the first module. If the data packet is from outside of the management domain and the data packet needs to be forwarded in the management domain, the virtual MAC processing unit encapsulates the data packet by the destination virtual MAC address of the data and with the virtual MAC address of the non-convergence node as the source virtual MAC address, and forwards the data packet encapsulated to a next-hop node according to the virtual MAC forwarding table via the first module. If the data is from another node in the management domain, the virtual MAC processing unit determines whether a destination node of the data packet is the node itself. If the destination node of the data packet is the node itself, the virtual MAC processing unit decapsulates the data packet encapsulated by the virtual MAC address and sends the data decapsulated to the outside of the node via the first module. Otherwise, the data packet received is forwarded to a next-hop node via the first module according to the virtual MAC forwarding table and the identifier information for indicating the virtual MAC address domain of the node.

In this embodiment, the virtual MAC processing unit can determine whether the data needs to be forwarded in the management domain by determining whether the VID of the data received is the same as the VID used by management domain, or according to the destination MAC address or source MAC address of the data, or by determining whether the port from which the data is received belongs to the management domain.

If the node shown in FIG. 7 is a non-convergence node, the data packet received by the node from outside of the management domain will be encapsulated by virtual MAC addresses, and be forwarded to a next-hop node according to the virtual MAC forwarding table. If the data is received from a parent node or brother node, the node determines whether the node itself is the destination node. If the node is the destination node, the data packet is decapsulated and forwarded to the outside of the management domain. Otherwise, the data packet is forwarded to a next-hop node according to the virtual MAC forwarding table.

If the node as shown in FIG. 7 is a convergence node, and the data is received from a child node, the node determines whether the source virtual MAC address of the data packet belongs to the virtual MAC address domain of the node itself according to the identifier information of the virtual MAC address domain. If the source virtual MAC address of the data packet belongs to the virtual MAC address domain of the node itself, the data packet will be forwarded to a next-hop node according to the virtual MAC forwarding table. Otherwise, the data packet will be discarded. If the data packet is received from a parent node or brother node, the node forwards the data packet to a next-hop node according to the virtual MAC forwarding table.

Figure 8:
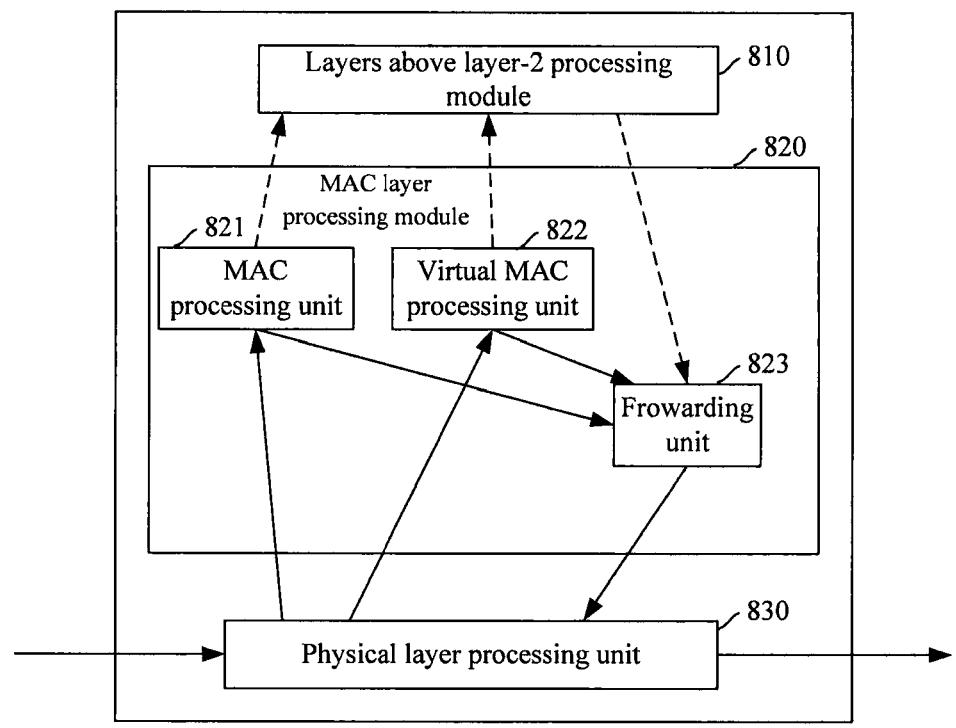
FIG. 8 is a schematic diagram of an application of the node shown in FIG. 7.

In applications, the node may be an Ethernet switch supporting IVL. With reference to FIG. 8, the structure of a practical application of the node shown in FIG. 7 is illustrated. In FIG. 8, physical layer processing module 830 corresponds to the first module in FIG. 7, MAC layer processing module 820 corresponds to the second module in FIG. 7, and layers above layer-2 processing module 810 corresponds to the third module which is optional in FIG. 7.

With reference to FIG. 8, MAC layer processing module 820 of the node device further includes MAC processing unit 821, virtual MAC processing unit 822 and forwarding unit 823.

MAC processing unit 821 is configured with the MAC address of the node and a MAC forwarding table configured by MAC addresses. MAC processing unit 821 forwards the data which is received from physical layer processing unit 830 and need not virtual MAC processing according to the MAC forwarding table through forwarding unit 823 and further through the first module.

Both virtual MAC processing unit 822 and MAC processing unit 821 can send the data packet, according to the address information in the data packet and after virtual MAC processing or MAC processing, to layers above layer-2 processing module 810 for processing in a layer above layer-2. Forwarding unit 823 receives the data returned by upper layer processing module 810 after the processing in a layer above layer-2, and sends the data via physical layer processing unit 830.

It can be seen from the exemplary embodiment that the data forwarding method and network and the node provided by the present disclosure for layer-2 network frees the number of ESPs reaching a destination node from being limited by the number of designated PBT VIDs, therefore the number of ESPs arriving at the destination node is expanded to 260 tag possibilities in limited network space. Furthermore, P2MP and MP2MP connections can thus be achieved, multicast and broadcast connections are supported, and the location information of a node can be learnt via the virtual MAC address of the node.

What is claimed is:

1. A method for forwarding data in a layer-2 network comprising a plurality of nodes in a management domain, the method comprising:
receiving, by a first node of the plurality of nodes, a first data packet comprising a customer destination media access control (MAC) address and customer data;
generating, by the first node, a second data packet comprising a source virtual MAC address, a destination virtual MAC address and at least part of the first data packet, wherein the at least part of the first data packet comprises the customer destination MAC address and the customer data, wherein the source virtual MAC address is a virtual MAC address assigned to the first node, and the destination virtual MAC address corresponds to the customer destination MAC address; wherein the virtual MAC address assigned to the first node comprises a first virtual MAC address segment with a first mask, which indicates a virtual MAC address space comprising virtual MAC addresses of child nodes of the first node; and
forwarding, by the first node, the second data packet to a parent node of the first node, via an egress port corresponding to the destination virtual MAC address, in order that the parent node forwards the second data packet without inserting a source virtual MAC address of the parent node into the second data packet.

2. The method according to claim 1, wherein the second data packet comprises the entire first data packet.

3. The method according to claim 1, wherein the second data packet is encapsulated in a format as defined in IEEE 802.1ah.

4. The method according to claim 1, wherein the virtual MAC address of each child node comprises a second virtual MAC address segment with a second mask, the length of the first virtual MAC address segment with the first mask is longer than the second virtual MAC address segment with the second mask, and the virtual MAC address space indicated by the second virtual MAC address segment with the second mask is included in the virtual MAC address space of the first node.

5. The method according to claim 1, wherein the second data packet further comprises a Virtual LAN Identifiers (VID) to which the egress port corresponds.

6. The method according to claim 1, further comprising:
receiving, by the first node, a third data packet encapsulated with a second source virtual MAC address and a second destination virtual MAC address;
determining, by the first node, that the third data packet is from a second node of the plurality of nodes in the management domain and the first node is a destination node of the third data packet; and
decapsulating the third data packet,
wherein the decapsulating the third data packet comprises:
decapsulating the third data packet according to the encapsulation format specified by IEEE 802.1ah;
deleting the second source virtual MAC address, the second destination virtual MAC address and an identifier of the virtual local area network from the third data packet received; or
replacing the second source virtual MAC address and the second destination virtual MAC address of the third data packet with a customer source MAC address and a second customer destination MAC address respectively.

7. A network comprising a management domain, which comprises a plurality of nodes, wherein
a first node of the plurality of nodes is configured to:
receive a first data packet comprising a customer destination media access control (MAC) address and customer data;
generate a second data packet comprising a source virtual MAC address, a destination virtual MAC address and at least part of the first data packet, wherein the at least part of the first data packet comprises the customer destination MAC address and the customer data, wherein the source virtual MAC address is a virtual MAC address assigned to the first node, and the destination virtual MAC address corresponds to the customer destination MAC address; wherein the virtual MAC address assigned to the first node comprises a first virtual MAC address segment with a first mask, which indicates a virtual MAC address space comprising virtual MAC addresses of child nodes of the first node;
forward the second data packet to a parent node of the first node, via an egress port corresponding to the destination virtual MAC address, in order that the parent node forwards the second data packet without inserting a source virtual MAC address of the parent node into the second data packet.

8. The network according to claim 7, wherein the second data packet comprises the entire first data packet.

9. The network according to claim 7, wherein the second data packet is encapsulated in a format as defined in IEEE 802.1ah.

10. The network according to claim 7, wherein the virtual MAC address of each child node comprises a second virtual MAC address segment with a second mask, the length of the first virtual MAC address segment with the first mask is longer than the second virtual MAC address segment with the second mask, and the virtual MAC address space indicated by the second virtual MAC address segment with the second mask is included in the virtual MAC address space of the first node.

11. The network according to claim 7, wherein the second data packet further comprises a Virtual LAN Identifiers (VID) to which the egress port corresponds.

12. The network according to claim 7, the plurality of nodes further comprises a second node, wherein the second node is configured to:
receive the second data packet;
determine that the second data packet is from a node in the management domain and the second node is a destination node of the second data packet;
decapsulate the second data packet according to the encapsulation format specified by IEEE 802.1ah; and
delete the source virtual MAC address, the destination virtual MAC address and an identifier of the virtual local area network from the second data packet; or
replace the source virtual MAC address and the destination virtual MAC address of the second data packet with a customer source MAC address and a second customer destination MAC address respectively.

13. A node device in a management domain of a layer-2 network, comprising:
- a processor; and
- a non-transitory computer readable medium having computer executable instructions stored thereon that, when executed by the processor, cause the processor to:
- receive a first data packet comprising a customer destination media access control (MAC) address and customer data;
- generate a second data packet comprising a source virtual MAC address, a destination virtual MAC address and at least part of the first data packet, wherein the at least part of the first data packet comprises the customer destination MAC address and the customer data, wherein the source virtual MAC address is a virtual MAC address assigned to the node device, and the destination virtual MAC address corresponds to the customer destination MAC address; wherein the virtual MAC address assigned to the node device comprises a first virtual MAC address segment with a first mask, which indicates a virtual MAC address space comprising virtual MAC addresses of child nodes of the node device;
- forward the second data packet to a parent node of the node device, via an egress port corresponding to the destination virtual MAC address, in order that the parent node forwards the second data packet without inserting a virtual MAC address of the parent node into the second data packet.

14. The node according to claim 13, wherein the second data packet comprises the entire first data packet.

15. The node according to claim 13, wherein the second data packet is encapsulated in a format as defined in IEEE 802.1ah.

16. The node according to claim 13, wherein the virtual MAC address of each child node comprises a second virtual MAC address segment with a second mask, the length of the first virtual MAC address segment with the first mask is longer than the second virtual MAC address segment with the second mask, and the virtual MAC address space indicated by the second virtual MAC address segment with the second mask is included in the virtual MAC address space of the node device.

17. The node according to claim 13, the processor is caused to:
- receive a third data packet encapsulated with a second source virtual MAC address and a second destination virtual MAC address;
- determine that the third data packet is from a node in the management domain and the node device is a destination node of the third data packet;
- decapsulate the third data packet according to the encapsulation format specified by IEEE 802.1ah; and
- delete the second source virtual MAC address, the second destination virtual MAC address and an identifier of the virtual local area network from the third data packet received; or
- replace the second source virtual MAC address and the second destination virtual MAC address of the third data packet with a customer source MAC address and a second customer destination MAC address respectively.

* * * * *